Dec. 10, 1957 R. L. FISCUS 2,815,604
FISHING BOBBER
Filed Jan. 6, 1956
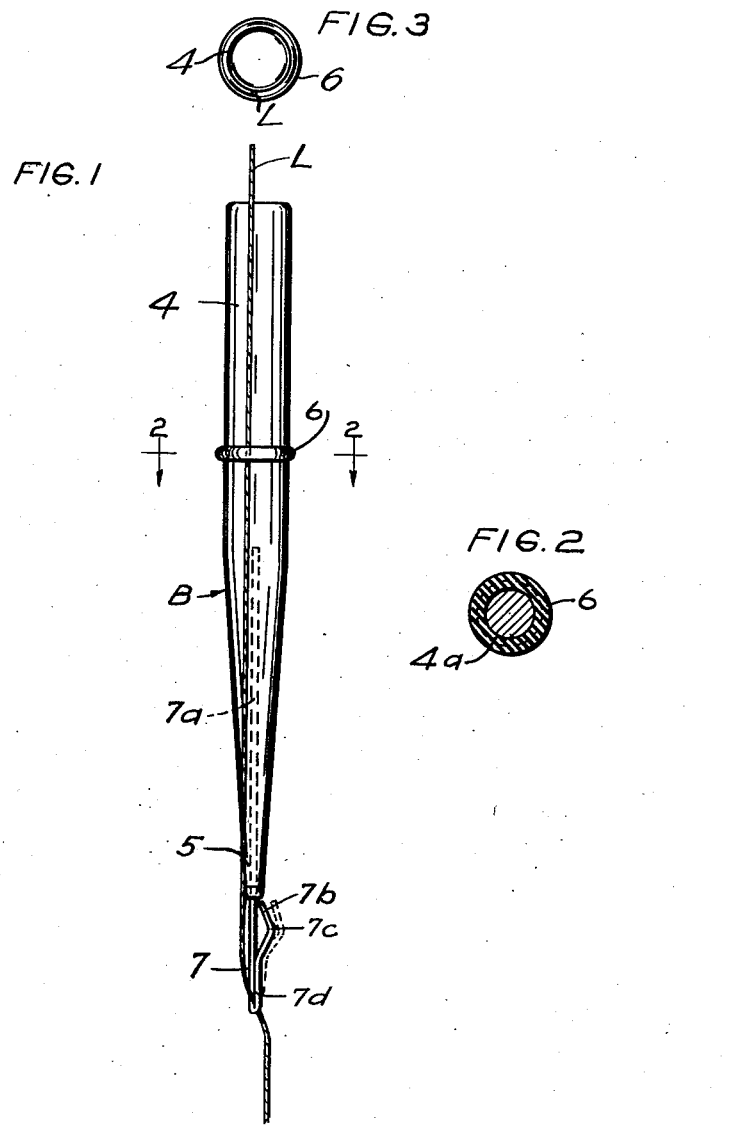
INVENTOR.
RAYMOND L. FISCUS
BY
Williamson, Schroeder,
Adams + Meyers
ATTORNEYS

United States Patent Office 2,815,604
Patented Dec. 10, 1957

2,815,604

FISHING BOBBER

Raymond L. Fiscus, Minneapolis, Minn.

Application January 6, 1956, Serial No. 557,802

4 Claims. (Cl. 43—44.95)

This invention relates to fishing bobbers adapted for general fishing purposes including winter fishing and adapted to be readily applied to a line to adjust the depth of the hook and bait.

It is an object of my invention to provide an inexpensive, highly efficient and sensitive bobber which makes possible ready attachment of the bobber to a line at various desired points for precisely adjusting the depth of the lure on the line.

A further object is to provide an efficient fishing bobber of the class described which may be quickly attached through cooperation of two attachment elements but which does not leave any attachment elements exposed for tangling with the line, other lines or obstruction.

Still another object is the provision of a very light, sensitive bobber of the class described which may be firmly secured by frictional engagement with a loop or bight of the line without passing the line itself through any loops or attachment elements of the device. In other words, with my structure, a bobber may be readily attached and the line adjusted thereafter to a fish line which previously has applied thereto the leader, weight and hook and lure.

These and other objects and advantages of my invention will more fully appear from the following description made in connection with the accompanying drawings, wherein like reference characters refer to the same or similar parts throughout the several views and in which:

Fig. 1 is a side elevation of an embodiment of my invention showing a line attached in one manner thereto;

Fig. 2 is a cross section taken along the line 2—2 of Fig. 1; and

Fig. 3 is a top elevation of the bobber as shown.

In the form of my invention illustrated, I provide an integral, solid bobber body designated as an entirety by the letter B, having an upper portion 4 of cylindrical shape and a lower, downwardly tapered portion 5 which terminates in a very restricted terminal end. The body B may be of any suitable buoyant material having a lower specific gravity than water, such as wood or composition material.

At its intermediate portion and preferably at a point disposed a few inches below the upper extremity of body B a relatively deep, peripheral or circumferential groove 4a is formed therein, adapted to tightly receive a flexible and elastic ring such as an O-ring 6.

At the lower extremity of the bobber, the fastener indicated as an entirety by the numeral 7, is attached in depending relation and constructed from suitable material such as a wire, having some resiliency and still capable of being deformed in the making thereof, to adapt itself to the peculiar non-tangling construction shown.

Fastener 7, as shown, has an elongated shank 7a which may be firmly secured within a bore drilled or burnt axially into the lower end of the bobber body B. The integral wire then depends for a short distance, say three-fourths of an inch below the lower extremity of the bobber body and is bent upwardly upon itself to form a closed jaw; thereafter, is bent outwardly and then again inwardly with its upper extremity 7b being disposed in very close relationship to the lower extremity of the body and being of a size to be disposed within the confines of the periphery of the lower extremity of the body and as shown in Fig. 1, being substantially in contact with the shank 7a.

The construction at the free end of the fastener element 7 provides an angular elbow 7c which may be readily manipulated by a finger or finger nail of the user to hold the same outwardly affording adequate space between the upper extremity thereof and the shank stem to easily insert a line therein, the line being forced downwardly between the close confining clamping jaws at the lower portion thereof.

In utilizing my improved bobber the line may be attached in either one of two different ways.

First, the elastic ring 6 is of such diameter that it may be readily expanded and slipped off either end of the body B. Thereafter, it may be slipped over a hook, leader and even sinker of the line, to encompass the line and then moved forwardly and upwardly into a position where the line as shown in Fig. 1, is engaged thereunder and frictionally held and clamped between the elastic ring and the deep groove 4a.

Attachment of the fastening element 7 is readily facilitated by springing the upward extremity 7b thereof outwardly through engagement of the elbow or angle 7c whereafter the line may be quickly passed downwardly into the frictional clamping jaws 7d at the lower end thereof.

To adjust the bobber for depth of line and bait, the line may be frictionally pulled through the two retaining or clamping devices 6 and 7 to obtain the desired length, of line below the bobber.

Another way in which the line may be secured without removal of the ring 6 from the bobber B is to merely make a bend or loop in the line, slightly expand the ring 6 and stuff the small loop or bend under the ring within the groove 4a. Thereafter, releasing the elastic ring will frictionally clamp the line in the groove.

It will be seen that with my bobber properly attached, there are no outwardly projecting spiral or other portions of the fastener elements to tangle with the line or with other fish lines or obstructions on a boat or gear which is being used.

The fastener element 7 is entirely shielded from entanglement with the line or the like since the terminal or upper end 7b thereof is confined close to the lower extremity of the bobber body and is disposed within the confines of that lower end.

From the foregoing description it will be seen that I have provided a highly sensitive, efficient bobber for fishing which may be readily applied to a line and very quickly adjusted for depth of a bait through frictional pulling of the line through the two clamping and retaining elements.

It will further be seen that there are no outwardly projecting or protruding portions of the fastener elements or any other parts of the bobber to ensnare or become tangled with lines or other obstructing media.

It will of course be understood that various changes may be made in the form, details, arrangement and proportions of the parts without departing from the scope of my invention.

I claim:

1. A fishing bobber comprising a buoyant body having a line clamping and retaining element adjacent the upper end thereof, a line fastener element at the lower end thereof comprising a depending shank axially extending from the lower extremity of said body and being then upwardly bent upon itself to form line clamping jaws, thereafter protruding first outwardly and then inwardly from said shank with its extremity disposed immediately below and within the confines of the lower extremity of the body and substantially in contact with said shank.

2. A fishing bobber comprising a body having a circumferential groove encircling the periphery thereof at an intermediate portion, a flexible and elastic annular member tightly fitting said groove and being temporarily separable therefrom for receiving a line between its inner surface and said groove to tightly clamp and retain the same in various adjusted positions and a line fastener element at the lower end of said body comprising a depending shank substantially axially extending from the lower extremity of said body and then being upwardly bent upon itself to form substantially closed line clamping jaws, thereafter protruding first outwardly and then inwardly from said shank with its extremity disposed immediately below and within the confines of the lower extremity of the body and very close to said shank to prevent tangling thereof with a line or the like.

3. The structure set forth in claim 2 and said body being elongated and having a downwardly tapered lower end and said fastener element having its shank embedded in the lower portion of said body.

4. A fishing bobber adapted to be applied to a fishing line without disturbing any of the tackle carried by said line, comprising a buoyant body having upper and lower ends, said lower end terminating in a circular extremity, a line fastener element at said lower end comprising a depending shank extending substantially axially from said lower extremity, and then being bent sharply upwardly upon itself to form substantially closed line clamping jaws, thereafter protruding first outwardly and then inwardly from said shank with its extremity disposed immediately below and within the circular confines of the lower extremity of said body and in very close relation to said shank to positively prevent tangling of said element with lines, weeds or other obstructions.

References Cited in the file of this patent

UNITED STATES PATENTS

| | | |
|---|---|---|
| 595,664 | Wenger | Dec. 14, 1897 |
| 1,934,845 | Durham | Nov. 14, 1933 |